United States Patent
Hegi

(10) Patent No.: US 9,994,771 B2
(45) Date of Patent: *Jun. 12, 2018

(54) LIQUID CRYSTAL POLYESTER RESIN COMPOSITION, CONNECTOR, AND METHOD FOR PRODUCING LIQUID CRYSTAL POLYESTER RESIN COMPOSITION

(71) Applicant: Sumitomo Chemical Company, Limited, Tokyo (JP)

(72) Inventor: Hiromitsu Hegi, Ibaraki (JP)

(73) Assignee: Sumitomo Chemical Company, Limited, Tokyo (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 14/732,099

(22) Filed: Jun. 5, 2015

(65) Prior Publication Data
US 2015/0353827 A1   Dec. 10, 2015

(30) Foreign Application Priority Data
Jun. 9, 2014   (JP) .................................. 2014-118455

(51) Int. Cl.
C08K 3/36   (2006.01)
C09K 19/38   (2006.01)
(Continued)

(52) U.S. Cl.
CPC ............ *C09K 19/3809* (2013.01); *B29B 7/90* (2013.01); *C09K 19/54* (2013.01); *B29B 7/38* (2013.01);
(Continued)

(58) Field of Classification Search
CPC .................................................... C09K 19/54
See application file for complete search history.

(56) References Cited

U.S. PATENT DOCUMENTS

| 2003/0181560 A1* | 9/2003 | Kawaguchi ............. B32B 15/08 524/424 |
| 2008/0064824 A1* | 3/2008 | Suzuki ................... C08K 3/346 525/342 |

(Continued)

FOREIGN PATENT DOCUMENTS

| JP | 2005-097034 A | 4/2005 |
| JP | 2009-108179 A | 5/2009 |

(Continued)

OTHER PUBLICATIONS

Koide, "Liquid Crystal Polymers—Synthesis, Molding and Applications," CMC Publishing Co., Ltd., p. 95 (Jun. 5, 1987).

*Primary Examiner* — Chanceity Robinson
(74) *Attorney, Agent, or Firm* — Panitch Schwarze Belisario & Nadel LLP

(57) ABSTRACT

A liquid crystal polyester resin composition usable for molding a connector improved in dimensional stability is provided having a liquid crystal polyester and a platy inorganic filler. The platy inorganic filler has a primary particle having a ratio of particle diameter to thickness of 8 to 200, and the platy inorganic filler is contained in an amount of 50 to 250 parts by mass relative to 100 parts by mass of the liquid crystal polyester. A connector molded from the liquid crystal polyester resin composition is also provided. A method for producing a liquid crystal polyester resin composition includes a step of melt-kneading 100 parts by mass of a liquid crystal polyester with 50 to 250 parts by mass of a platy inorganic filler, the platy inorganic filler having a primary particle which has a ratio of particle diameter to thickness of 8 to 200.

8 Claims, 1 Drawing Sheet

Gate

(51) Int. Cl.
*C09K 19/54* (2006.01)
*B29B 7/90* (2006.01)
*B29K 67/00* (2006.01)
*B29K 105/00* (2006.01)
*B29K 509/00* (2006.01)
*C09K 19/52* (2006.01)
*B29B 7/38* (2006.01)
*B29B 9/06* (2006.01)
*B29B 9/16* (2006.01)

(52) U.S. Cl.
CPC . *B29B 9/06* (2013.01); *B29B 9/16* (2013.01); *B29K 2067/00* (2013.01); *B29K 2105/0079* (2013.01); *B29K 2509/00* (2013.01); *C09K 2019/521* (2013.01)

(56) References Cited

U.S. PATENT DOCUMENTS

| | | | |
|---|---|---|---|
| 2010/0163796 A1* | 7/2010 | Fukuhara | C09K 19/3809 252/299.61 |
| 2012/0217678 A1* | 8/2012 | Komatsu et al. | 264/328.1 |
| 2015/0038631 A1* | 2/2015 | Hamaguchi | C08J 3/203 524/449 |

FOREIGN PATENT DOCUMENTS

| | | | | |
|---|---|---|---|---|
| JP | WO 2013128887 A1 * | 9/2013 | | C08J 3/203 |
| WO | 2013128887 A1 | 9/2013 | | |

* cited by examiner

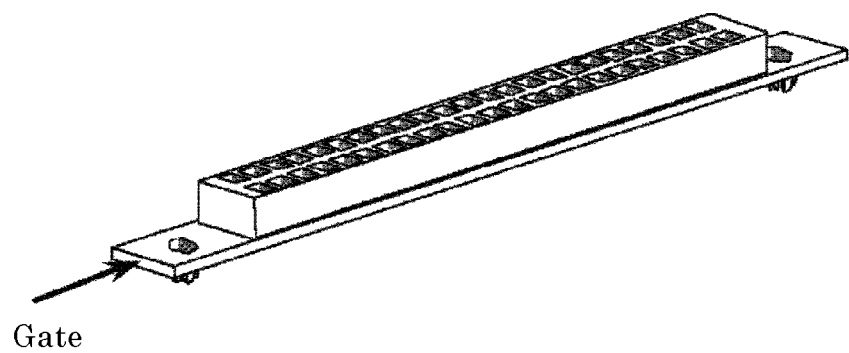
Gate

LIQUID CRYSTAL POLYESTER RESIN COMPOSITION, CONNECTOR, AND METHOD FOR PRODUCING LIQUID CRYSTAL POLYESTER RESIN COMPOSITION

BACKGROUND OF THE INVENTION

Field of the Invention

The present invention relates to a liquid crystal polyester resin composition, a connector made thereof, and a method for producing a liquid crystal polyester resin composition.

Description of the Related Art

As is known, liquid crystal polyesters have high melt fluidity by virtue of features that they are free from entanglement of molecule chains in the molten state due to the rigidity in their molecules, and their molecule chains are highly orientated in the flow direction by shear in a molding process, without losing the orientation at the time of being solidified. Taking advantage of such features, a resin composition obtained by mixing a liquid crystal polyester with, for example, a fibrous reinforcing agent such as glass fiber or an inorganic filling material such as talc, has been suitably used to produce a molded body having a thin part, particularly a connector having a thin part and relatively complex shape, and other similar electronic components. Meanwhile, the recent development of surface-mount technology and the trend of miniaturization of mobile devices such as cellular phones have led to an increased need for reduction in thickness of electronic components used therein, and those electronic components becoming more complex in shape. There is also an increasing demand for connectors with reduced thickness, etc. However, liquid crystal polyesters exhibit anisotropy in the mold shrinkage ratio in the flow direction relative to the mold shrinkage ratio in the direction perpendicular to the flow direction, resulting in poor dimensional stability. Therefore, connectors molded from liquid crystal polyesters have a problem of being susceptible to warpage. In an attempt to solve the problem, there has been proposed a liquid crystal polyester resin composition which is high in warpage-suppressing effectiveness; for example, JP-A-2009-108179 discloses that a resin composition obtained by use of mica as a platy filling material mixed with a liquid crystal polyester can be used to mold a connector with less warpage.

Patent Document 1: JP 2009-108179 A

SUMMARY OF THE INVENTION

There remains a need for a liquid crystal polyester resin composition usable for molding a connector which is further improved in dimensional stability.

The present invention encompasses the following <1> to <10>:

<1> A liquid crystal polyester resin composition comprising: a liquid crystal polyester and 50 to 250 parts by mass, relative to 100 parts by mass of the liquid crystal polyester, of a platy inorganic filler having a primary particle which has a ratio of its particle diameter of the primary particle to its thickness within a range of from 8 to 200;
<2> The liquid crystal polyester resin composition according to <1>, wherein the platy inorganic filler is talc or mica;
<3> The liquid crystal polyester resin composition according to <1> or <2>, wherein the platy inorganic filler is mica;
<4> The liquid crystal polyester resin composition according to any one of <1> to <3>, wherein the platy inorganic filler has a ratio of the particle diameter of the primary particle to the thickness which is the range of from 10 to 150;
<5> The liquid crystal polyester resin composition according to any one of <1> to <4>, wherein the liquid crystal polyester resin composition contains the platy inorganic filler in an amount of 50 to 100 parts by mass, relative to 100 parts by mass of the liquid crystal polyester;
<6> The liquid crystal polyester resin composition according to any one of <1> to <5>, wherein the liquid crystal polyester comprises a repeating unit represented by the following formula (1), a repeating unit represented by the following formula (2), and a repeating unit represented by the following formula (3):

—O—Ar¹—CO— (1)

—CO—Ar¹—CO— (2)

—X—Ar³—Y— (3)

wherein $Ar^1$ represents a phenylene group, a naphthylene group, or a biphenylylene group; $Ar^2$ and $Ar^3$ each independently represent a phenylene group, a naphthylene group, a biphenylylene group, or a group represented by the following formula (4); X and Y each independently represent an oxygen atom or an imino group (—NH—); and each hydrogen atom constituting the group represented by $Ar^1$, $Ar^2$ or $Ar^3$ is independently optionally substituted with a halogen atom, an alkyl group or an aryl group;

—Ar⁴—Z—Ar⁵— (4)

wherein $Ar^4$ and $Ar^5$ each independently represent a phenylene group or a naphthylene group; and Z represents an oxygen atom, a sulfur atom, a carbonyl group, a sulfonyl group or an alkylidene group;
<7> A connector molded from the liquid crystal polyester resin composition according to any one of <1> to <6>;
<8> A method for producing a liquid crystal polyester resin composition comprising a step of melt-kneading a liquid crystal polyester and 50 to 250 parts by mass, relative to 100 parts by mass of the liquid crystal polyester, of a platy inorganic filler having a primary particle which has a ratio of its particle diameter of a primary particle to its thickness within a range of from 8 to 200;
<9> The method according to <8>, wherein the platy inorganic filler is subjected to the melt-kneading step in form of an aggregate in which the platy inorganic filler is agglomerated.
<10> The method according to <8> or <9>, wherein the aggregate is a granular material.

When the liquid crystal polyester resin composition of the present invention is used to mold a connector, the connector having higher dimensional stability can be produced.

BRIEF DESCRIPTION OF THE DRAWINGS

FIG. 1 is a view showing a mold for a connector.

DETAILED DESCRIPTION OF THE PREFERRED EMBODIMENTS

The present invention will be described in detail below.

The liquid crystal polyester is a liquid crystal polyester which exhibits liquid crystallinity in its molten state and preferably melts at a temperature of 450° C. or lower. The liquid crystal polyester may be a liquid crystal polyester amide, a liquid crystal polyester ether, a liquid crystal polyester carbonate, or a liquid crystal polyester imide.

Preferably, the liquid crystal polyester is a wholly aromatic liquid crystal polyester consisting only of an aromatic compound as a raw material monomer.

Examples of the liquid crystal polyester include: a polymer obtained by polymerizing (polycondensing) an aromatic hydroxy carboxylic acid, an aromatic dicarboxylic acid, and at least one compound selected from the group consisting of an aromatic diol, an aromatic hydroxylamine and an aromatic diamine; a polymer obtained by polymerizing plural kinds of aromatic hydroxy carboxylic acid; a polymer obtained by polymerizing an aromatic dicarboxylic acid and at least one compound selected from the group consisting of an aromatic diol, an aromatic hydroxylamine and an aromatic diamine; and a polymer obtained by polymerizing a polyester, such as polyethylene terephthalate, and an aromatic hydroxy carboxylic acid. A polymerizable derivative of the aromatic hydroxy carboxylic acid, aromatic dicarboxylic acid, aromatic diol, aromatic hydroxylamine or aromatic diamine can be independently used in place of it, or can be independently used as a mixture thereof.

Examples of the polymerizable derivatives of carboxyl group-containing compounds, such as an aromatic hydroxy carboxylic acid and an aromatic dicarboxylic acid, include a compound (ester) in which a carboxyl group is substituted with an alkoxycarbonyl group or an aryloxycarbonyl group, a compound (acid halide) in which a carboxyl group is substituted with a haloformyl group, and a compound (acid anhydride) in which a carboxyl group is substituted with an acyloxycarbonyl group. Examples of the polymerizable derivatives of hydroxyl group-containing compounds, such as an aromatic hydroxy carboxylic acid, an aromatic diol, and an aromatic hydroxylamine, include a compound (acylated derivative) in which a hydroxyl group is acylated to be substituted with an acyloxyl group. Examples of the polymerizable derivatives of amino group-containing compounds, such as an aromatic hydroxylamine and an aromatic diamine, include a compound (acylated derivative) in which an amino group is acylated to be substituted with an acylamino group.

The liquid crystal polyester preferably includes a repeating unit represented by the following formula (1) (hereinafter also referred to as "repeating unit (1)"), more preferably includes the repeating unit (1), a repeating unit represented by the following formula (2) (hereinafter also referred to as "repeating unit (2)"), and a repeating unit represented by the following formula (3) (hereinafter also referred to as "repeating unit (3)").

—O—Ar$^1$—CO— (1)

—CO—Ar$^2$—CO— (2)

—X—Ar$^3$—Y— (3)

In the formulae (1) to (3), Ar$^1$ represents a phenylene group, a naphthylene group, or a biphenylylene group; Ar$^2$ and Ar$^3$ each independently represent a phenylene group, a naphthylene group, a biphenylylene group, or a group represented by the following formula (4); X and Y each independently represent an oxygen atom or an imino group (—NH—); and each hydrogen atom present in the group represented by Ar$^1$, Ar$^2$ or Ar$^3$ is independently optionally substituted with a halogen atom, an alkyl group or an aryl group.

—Ar$^4$—Z—Ar$^5$— (4)

In the formula (4), Ar$^4$ and Ar$^5$ each independently represent a phenylene group or a naphthylene group; and Z represents an oxygen atom, a sulfur atom, a carbonyl group, a sulfonyl group or an alkylidene group.

Examples of the halogen atom include a fluorine atom, a chlorine atom, a bromine atom and an iodine atom. Examples of the alkyl group include a methyl group, an ethyl group, a n-propyl group, an isopropyl group, a n-butyl group, an isobutyl group, a s-butyl group, a t-butyl group, a n-hexyl group, a 2-ethylhexyl group, a n-octyl group and a n-decyl group, each of which usually has 1 to 10 carbon atoms. Examples of the aryl group include a phenyl group, an o-tolyl group, a m-tolyl group, a p-tolyl group, a 1-naphthyl group and a 2-naphthyl group. In the aryl group, at least one of hydrogen atoms contained therein are optionally substituted by a substituent, and the total carbon number of such the aryl group is usually 6 to 20. In the case where the hydrogen atom in Ar$^1$, Ar$^2$ or Ar$^3$ is substituted with any of these groups, the number of hydrogen atoms substituted is usually 2 or less, preferably 1 or less in each of the groups represented by Ar$^1$, Ar$^2$ or Ar$^3$, independently.

Examples of the alkylidene group include a methylene group, an ethylidene group, an isopropylidene group, a n-butylidene group and a 2-ethylhexylidene group, each of which usually has 1 to 10 carbon atoms.

The repeating unit (1) is a repeating unit derived from a given aromatic hydroxy carboxylic acid. The repeating unit (1) is preferably such that Ar$^1$ is a p-phenylene group (a repeating unit derived from p-hydroxybenzoic acid), or Ar$^1$ is a 2,6-naphthylene group (a repeating unit derived from 6-hydroxy-2-naphthoic acid).

The repeating unit (2) is a repeating unit derived from a given aromatic dicarboxylic acid. The repeating unit (2) is preferably such that Ar$^2$ is a p-phenylene group (a repeating unit derived from terephthalic acid); Ar$^2$ is a m-phenylene group (a repeating unit derived from isophthalic acid); Ar$^2$ is a 2,6-naphthylene group (a repeating unit derived from 2,6-naphthalenedicarboxylic acid); or Ar$^2$ is a diphenylether-4,4'-diyl group (a repeating unit derived from diphenylether-4,4'-dicarboxylic acid).

The repeating unit (3) is a repeating unit derived from a given aromatic diol, aromatic hydroxylamine or aromatic diamine. The repeating unit (3) is preferably such that Ar$^3$ is a p-phenylene group (a repeating unit derived from hydroquinone, p-aminophenol or p-phenylenediamine), or Ar$^2$ is a 4,4'-biphenylylene group (a repeating unit derived from 4,4'-dihydroxybiphenyl, 4-amino-4'-hydroxybiphenyl or 4,4'-diaminobiphenyl).

The amount of the repeating unit (1) contained is usually 30 mol % or more, preferably 30 to 80 mol %, more preferably 40 to 70 mol %, further preferably 45 to 65 mol % relative to the total amount of all repeating units. The "total amount of all repeating units" refers to a value obtained by dividing mass of each of the repeating units constituting the liquid crystal polyester by formula weight of each of the repeating units to calculate each amount of substance (moles) of the respective repeating units, and then summing the obtained values. The mass of each of the repeating units constituting the liquid crystal polyester is calculated from the amount of corresponding raw material monomers used, and is a value relative to the assumption that all of the raw material monomers are reacted. In line with the above, the amount of the repeating unit (2) contained is usually 35 mol % or less, preferably 10 to 35 mol %, more preferably 15 to 30 mol %, further preferably 17.5 to 27.5 mol % relative to the total amount of all repeating units. The amount of the repeating unit (3) contained is usually 35 mol % or less, preferably 10 to 35 mol %, more preferably 15 to 30 mol %, further preferably 17.5 to 27.5 mol % relative to the total amount of all repeating units. The larger the amount of the repeating unit (1) is, the stronger the tendency of the polyester to have improved melt flowability, heat resistance, and strength/rigidity. When the amount of the repeating unit (1) is larger, the melt temperature or melt viscosity of the polyester is likely to be higher, however, the amount of the repeating units (1) is 80 mol % or more, the temperature required for molding is prone to be high.

The amount ratio of the repeating unit (2) to the repeating unit (3), calculated by an expression {amount of repeating unit (2)}/{amount of repeating unit (3)} (mol %/mol %), is usually 0.9 to 1.11, preferably 0.95 to 1.05, more preferably 0.98 to 1.02.

The repeating units (1) to (3) in the liquid crystal polyester may each independently be derived from either one kind of raw material monomer, or two or more kinds of raw material monomer. The liquid crystal polyester may include a repeating unit other than the repeating units (1) to (3), provided that the amount thereof is usually 10 mol % or less, preferably 5 mol % or less relative to the total amount of all repeating units.

Preferably, the liquid crystal polyester has the repeating unit (3) such that X and Y are each an oxygen atom, that is, a repeating unit derived from a given aromatic diol, because it facilitates reduction in melt viscosity. More preferably, any repeating unit (3) in the liquid crystal polyester is exclusively such that X and Y are each an oxygen atom.

Preferably, the liquid crystal polyester is produced by melt-polymerizing raw material monomers corresponding to the respective repeating units constituting the liquid crystal polyester to obtain a polymer (hereinafter also referred to as "prepolymer"), followed by subjecting the obtained prepolymer to solid phase polymerization. This makes it possible to produce the liquid crystal polyester with high molecular weight having enhanced heat resistance and strength or rigidity in a manner of good handleability. The melt polymerization may be carried out in the presence of a catalyst. Examples of the catalyst include metal compounds such as magnesium acetate, stannous acetate, tetrabutyl titanate, lead acetate, sodium acetate, potassium acetate and antimony trioxide, and nitrogen-containing heterocyclic compounds such as 4-(dimethylamino)pyridine and 1-methylimidazole. Among them, nitrogen-containing heterocyclic compounds are preferred.

The liquid crystal polyester usually has an incipient fluidization temperature of 270° C. or more, preferably 270 to 400° C., more preferably 280 to 380° C. The higher the incipient fluidization temperature is, the stronger the tendency of the polyester to have improved heat resistance and strength or rigidity. When the incipient fluidization temperature is 400° C. or less, the thin-wall fluidity is higher and the molding process ability is more excellent.

The incipient fluidization temperature, also called flow temperature or fluidizing temperature, is a temperature at which the viscosity reaches 4800 Pa*s (48000 poises) as measured by melting the liquid crystal polyester while heating it at a rate of 4° C./min, and extruding the melt under a load of 9.8 MPa (100 kg/cm$^2$) through a nozzle with an inner diameter of 1 mm and a length of 10 mm of a capillary rheometer. The incipient fluidization temperature gives an indication of a molecular weight of a liquid crystal polyester (see "Liquid Crystal Polymers—Synthesis, Molding, and Applications—", edited by Naoyuki Koide, CMC Publishing Co., Ltd., Jun. 5, 1987, p. 95).

In range of the ratio of the repeating unit mentioned above, the liquid crystal polyesters having the same repeating units and a different ratio of the repeating units each other can be used together. The liquid crystal polyester resin composition of the present invention may contain one or more additional ingredients such as, an additive, or a resin other than the liquid crystal polyester.

In the liquid crystal polyester resin composition of the present invention, a platy inorganic filler having a primary particle which has a ratio of its particle diameter of a primary particle to its thickness within a range of from 8 to 200 is contained at a predetermined proportion. This liquid crystal polyester resin composition can be formed into a connector which has excellent dimensional stability. The dimensional stability can be evaluated by the anisotropy ratio thereof. The mold shrinkage ratio on each side of the molded article can be calculated in such a manner that a difference between the length of each side of the molded article and the dimension of a mold at normal temperature is divided by the dimension of the mold.

The mold shrinkage ratio in the resin flow direction is herein referred to as MD, and the mold shrinkage ratio in the transverse direction perpendicular to the resin flow direction is referred to as TD. As used herein, the mold shrinkage ratio in the flow direction (MD) refers to an average of the values obtained with regard to two sides of the article in the resin flow direction, and the mold shrinkage ratio in the transverse direction (TD) refers to an average of the values obtained with regard to two sides of the article in the direction perpendicular to the resin flow direction. The anisotropy ratio (MD/TD) is calculated by dividing the mold shrinkage ratio in the flow direction (MD) by the mold shrinkage ratio in the transverse direction (TD). As the anisotropy ratio comes closer to 1, it indicates that the anisotropy is lower. When the anisotropy ratio (MD/TD) is within the range of 0.6 to 1.4, it indicates that the dimensional stability is especially high.

The ratio of a particle diameter of the primary particle of the platy inorganic filler to its thickness is within the range of 8 to 200, preferably 10 to 150, more preferably 10 to 100, further preferably 8 to 30. When the ratio of a particle diameter of the primary particle of the platy inorganic filler to its thickness is smaller than 8, the anisotropy of the resulting molded article tends to be increased. As used herein, the particle diameter of the primary particle refers to a volume average particle diameter of the primary particle. The volume average particle diameter refers to a particle diameter at a cumulative volume of 50% in a cumulative particle size distribution on a volumetric basis obtained by using, for example, a laser diffraction/scattering particle size distribution analyzer. The thickness of the platy inorganic filler of its primary particle is obtained by obtaining a SEM imaging of the cross section of the platy inorganic filler, reading out the thicknesses of the platy inorganic filler directly from the obtained image and calculating the average value thereof. The cross section of the platy inorganic filler, for example, can be obtained by embedding the platy inorganic filler in an epoxy resin and polishing the epoxy resin to expose the cross section of the platy inorganic filler. The ratio of a particle diameter of the primary particle to its thickness can be calculated by dividing the volume average particle diameter by the thickness of the platy inorganic filler.

Examples of the platy inorganic filler include mica, talc, graphite, wollastonite, glass flake, barium sulfate and calcium carbonate. Preferred is mica or talc, more preferred is mica. The mica may be any of muscovite, phlogopite, fluorphlogopite or tetrasilicic mica. As the platy inorganic filler, it can be used one kind or two or more kinds. The amount of the platy inorganic filler contained is 50 to 250 parts by mass, preferably 50 to 150 parts by mass, more preferably 50 to 100 parts by mass, further preferably 67 to 100 parts by mass relative to 100 parts by mass of the liquid crystal polyester. When the amount of the platy inorganic filler is within this range, the anisotropy ratio derived from the liquid crystal polyester tends to be reduced by virtue of the platy inorganic filler. Thus, the anisotropy ratio of the molded article can be controlled to fall within the above-defined range, so that the molded article has excellent dimensional stability.

Examples of a different inorganic filler than the platy inorganic filler include a fibrous inorganic filler and a granular inorganic filler. Examples of the fibrous inorganic filler include glass fibers; carbon fibers such as a PAN-based carbon fiber and a pitch-based carbon fiber; ceramic fibers such as a silica fiber, an alumina fiber and an alumina-silica fiber; and metallic fibers such as a stainless steel fiber. Another examples thereof are whiskers such as potassium titanate whisker, barium titanate whisker, wollastonite whisker, aluminum borate whisker, silicon nitride whisker and silicon carbide whisker. Examples of the granular inorganic filler include silica, alumina, titanium oxide, glass bead, glass balloon, boron nitride, silicon carbide and calcium carbonate. The amount of the different inorganic filler than the platy inorganic filler is usually 0 to 150 parts by mass relative to 100 parts by mass of the liquid crystal polyester.

Examples of the additive include an antioxidant, a thermal stabilizer, an ultraviolet absorber, an antistatic agent, a surfactant, a flame retardant and coloring agent. The amount of the additive contained is usually 0 to 5 parts by mass relative to 100 parts by mass of the liquid crystal polyester.

Examples of the resin other than the liquid crystal polyester include thermoplastic resins other than the liquid crystal polyester, such as polypropylene, polyamide, a different polyester than the liquid crystal polyester, polysulfone, polyphenylene sulfide, polyether ketone, polycarbonate, polyphenylene ether and polyetherimide; and thermosetting resins such as a phenolic resin, an epoxy resin, a polyimide resin and a cyanate resin. The amount of the resin other than the liquid crystal polyester is usually 0 to 20 parts by mass relative to 100 parts by mass of the liquid crystal polyester.

The method for producing a liquid crystal polyester resin composition according to the present invention includes a step of melt-kneading 100 parts by mass of a liquid crystal polyester with 50 to 250 parts by mass of a platy inorganic filler, the platy inorganic filler having a primary particle which has a ratio of a particle diameter of the primary particle of the platy inorganic filler to its thickness of 8 to 200. It is desirable that the liquid crystal polyester, the platy inorganic filler and other ingredients added as required be melt-kneaded using an extruder, and extruded into a pellet. The extruder used is preferably an extruder including a cylinder, one or more screws provided in the cylinder and one or more feed ports provided on the cylinder, more preferably such an extruder further including one or more vent parts provided in the cylinder.

In the melt-kneading, the platy inorganic filler may be used as it is in the melt-kneading step, but preferably the platy inorganic filler is agglomerated into an aggregate to be used in the melt-kneading step. Agglomeration of the platy inorganic filler may be carried out by, for example, a spray drying method, a compression-extrusion method, or roll press processing. Examples of a commercially available product of this aggregate include A-21B (produced by Yamaguchi Mica Co., Ltd.), 21PU (produced by Yamaguchi Mica Co., Ltd.), 21UG (produced by Yamaguchi Mica Co., Ltd.), and 41PU5 (produced by Yamaguchi Mica Co., Ltd.). The secondary particles of the aggregate obtained by agglomeration of the platy inorganic filler may be, for example, granular, spherical, or platy in shape, and are preferably granular.

The method for producing a liquid crystal polyester resin composition according to the present invention may further include a step of subjecting the extruded pellet to a molding process. For molding with the liquid crystal polyester resin composition, a melt molding method may preferably be used. Examples of the method include an injection molding method, an extrusion molding method such as T-die extrusion or inflation molding, a compression molding method, a blow molding method, a vacuum molding method, and a press molding method. Among them, an injection molding method is preferred.

The liquid crystal polyester resin composition may be formed into various molded bodies as products or parts. Examples of those products or parts include bobbins such as optical pickup bobbins and transformer bobbins; relay parts such as relay cases, relay bases, relay sprues and relay armatures; connectors such as RIMM, DDR, CPU sockets, S/O, DIMM, Board to Board connectors, FPC connectors and card connectors; reflectors such as lamp reflectors and LED reflectors; holders such as lamp holders and heater holders; diaphragms such as speaker diaphragms; separation claws such as those for copy machines or printers; camera module parts; switch parts; motor parts; sensor parts; hard disc drive parts; dishwares such as ovenwares; vehicle parts; aircraft parts; and sealing parts such as those for sealing semiconductor devices or coils.

The polyester resin composition of the present invention is preferably formed into a connector through a molding process (preferably by an injection molding method).

EXAMPLES

Thickness of Platy Inorganic Filler

After the platy inorganic filler was embedded in an epoxy resin, the epoxy resin was polished to expose the cross section of the platy inorganic filler. SEM imaging of the cross section of the platy inorganic filler was performed at a magnification of 4000 to directly read out thicknesses of the platy inorganic filler from the obtained image and calculate the average value thereof, thus obtaining the thickness of the platy inorganic filler. In calculation of the average value, the parameter was set at 100.

Volume Average Particle Diameter

The volume average particle diameter used was the particle diameter at a cumulative volume of 50% in a cumulative particle size distribution on a volumetric basis obtained by using Laser Diffraction/Scattering Particle Size Distribution Analyzer (LA-950V2, manufactured by HORIBA, Ltd.).

Ratio of Particle Diameter to Thickness

The ratio of particle diameter to thickness was calculated by dividing the volume average particle diameter by the thickness of the platy inorganic filler.

Mold Shrinkage Ratio, Anisotropy Ratio

A flat test piece mold of 64 mm on each side and 3 mm thick, having a film gate on its one side, was used to form a test piece. The length of each side of the molded piece was measured by a micrometer. The difference between the measured length and the dimension of the mold at normal temperature was divided by the dimension of the mold to obtain the mold shrinkage ratio on each side of the molded piece. The average of the values obtained on two sides of the piece in the resin flow direction was taken as the mold shrinkage ratio in the flow direction (MD), and the average of the values obtained on two sides of the piece in the direction perpendicular to the resin flow direction was taken as the mold shrinkage ratio in the transverse direction (TD). A decrease in the mold shrinkage ratios means an increase in dimensional stability. The mold shrinkage ratio in the flow direction (MD) was divided by the mold shrinkage ratio in the transverse direction (TD) to obtain the anisotropy ratio (MD/TD). As the anisotropy ratio comes closer to 1, it indicates that the anisotropy is lower. In the present invention, when the anisotropy ratio (MD/TD) is within the range of 0.6 to 1.4, it indicates that the dimensional stability is especially high.

Production Example 1 (Production of Liquid Crystal Polyester (1))

Into a reactor equipped with a stirrer, a torque meter, a nitrogen gas inlet, a thermometer and a reflux condenser, 994.5 g (7.2 mol) of p-hydroxybenzoic acid, 299.0 g (1.8 mol) of terephthalic acid, 99.7 g (0.6 mol) of isophthalic acid, 446.9 g (2.4 mol) of 4,4'-dihydroxybiphenyl and 1347.6 g (13.2 mol) of acetic anhydride were introduced. After the gas in the reactor was replaced with a nitrogen gas, 0.18 g of 1-methylimidazole was added thereto. In a nitrogen gas stream, the mixture was heated by raising the temperature from room temperature to 150° C. over 30 minutes under stirring, followed by reflux at 150° C. for 30 minutes. Subsequently, 2.4 g of 1-methylimidazole was added, and the temperature was raised from 150° C. to 320° C. over 2 hours and 50 minutes while distilling off by-product acetic acid and unreacted acetic anhydride. After torque rise was observed, the content of the reactor was taken out, and was then cooled to room temperature to obtain a solid. The obtained solid was pulverized by a pulverizer. In a nitrogen atmosphere, the pulverized material was heated by raising the temperature from room temperature to 250° C. over 1 hour, then further raising it from 250° C. to 295° C. over 5 hours, and maintaining at 295° C. for 3 hours to carry out solid phase polymerization of the material. Thereafter, the resultant was cooled to afford powdery liquid crystal polyester (1). The liquid crystal polyester (1) was found to have an incipient fluidization temperature of 327° C.

Production Example 2 (Production of Liquid Crystal Polyester (2))

Into a reactor equipped with a stirrer, a torque meter, a nitrogen gas inlet, a thermometer and a reflux condenser, 994.5 g (7.2 mol) of p-hydroxybenzoic acid, 239.2 g (1.44 mol) of terephthalic acid, 159.5 g (0.96 mol) of isophthalic acid, 446.9 g (2.4 mol) of 4,4'-dihydroxybiphenyl and 1347.6 g (13.2 mol) of acetic anhydride were introduced. After the gas in the reactor was replaced with a nitrogen gas, 0.18 g of 1-methylimidazole was added thereto. In a nitrogen gas stream, the mixture was heated by raising the temperature from room temperature to 150° C. over 30 minutes under stirring, followed by reflux at 150° C. for 30 minutes. Subsequently, 2.4 g of 1-methylimidazole was added, and the temperature was raised from 150° C. to 320° C. over 2 hours and 50 minutes while distilling off by-product acetic acid and unreacted acetic anhydride. After torque rise was observed, the content of the reactor was taken out, and was then cooled to room temperature to obtain a solid. The obtained solid was pulverized by a pulverizer. In a nitrogen atmosphere, the pulverized material was heated by raising the temperature from room temperature to 220° C. over 1 hour, then further raising it from 220° C. to 240° C. over 30 minutes, and maintaining at 240° C. for 10 hours to carry out solid phase polymerization of the material. Thereafter, the resultant was cooled to afford powdery liquid crystal polyester (2). The liquid crystal polyester (2) was found to have an incipient fluidization temperature of 286° C.

Aggregate

Aggregates used were Filling material A, Filling material B, Filling material C and Filling material D as below.

Filling material A: mica ("A-21B" produced by Yamaguchi Mica Co., Ltd.; in which secondary particles are granular; and primary particles have a ratio of particle diameter to thickness of 15)

Filling material B: mica ("AB-25S" produced by Yamaguchi Mica Co., Ltd.; in which secondary particles are powdery; and primary particles have a ratio of particle diameter to thickness of 30)

Filling material C: talc (in which secondary particles are powdery; and primary particles have a ratio of particle diameter to thickness of 10)

The Filling material C can be produced by the method described in JP-A-2005-97034.

Filling material D: talc ("X-50" produced by Nippon Talc Co., Ltd.; in which secondary particles are powdery; and primary particles have a ratio of particle diameter to thickness of 6)

Examples 1 to 5 and Comparative Examples 1 to 7

The liquid crystal polyester (1), the liquid crystal polyester (2), and the aggregates described above were mixed in the proportions shown in Tables 1 and 2 by using a Henschel mixer. Thereafter, granulation was performed using a twin screw extruder (model PCM-30, manufactured by Ikegai Iron Works, Ltd.) under the condition of a cylinder temperature of 330° C. to obtain a liquid crystal polyester resin composition in each Example and Comparative Example.

Each of the obtained liquid crystal polyester resin compositions was subjected to drying treatment at 120° C. for 12 hours, followed by molding process with an injection molding machine (model PS40E5ASE, manufactured by Nissei Plastic Industrial Co., Ltd.) under conditions of a cylinder temperature of 350° C. and a mold temperature of 130° C. to obtain a flat test piece with a size of 64 mm×64 mm×3 mm. The mold shrinkage ratio and anisotropy ratio of the obtained test piece was measured. The results are shown in Tables 1 and 2.

TABLE 1

| | Unit | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|---|
| Liquid crystal polyester (1) | Parts by weight | 55 | 55 | 55 | 55 | 55 | 55 | 55 | 55 |
| Liquid crystal polyester (2) | Parts by weight | 45 | 45 | 45 | 45 | 45 | 45 | 45 | 45 |
| Filling material A | Parts by weight | 67 | 100 | 33 | — | — | — | — | — |
| Filling material B | Parts by weight | — | — | — | — | — | — | 43 | — |
| Filling material C | Parts by weight | — | — | — | — | — | — | — | — |
| Filling material D | Parts by weight | — | — | — | 43 | 67 | 100 | — | — |
| Mold shrinkage ratio | MD % | 0.28 | 0.38 | 0.16 | 0.28 | 0.31 | 0.42 | 0.21 | 0.22 |
| | TD % | 0.41 | 0.35 | 0.75 | 1.13 | 0.85 | 0.74 | 0.89 | 0.47 |
| Anisotropy ratio | MD/TD — | 0.69 | 1.09 | 0.21 | 0.25 | 0.36 | 0.57 | 0.24 | 0.47 |

TABLE 2

| | Unit | Example 3 | Example 4 | Example 5 | Comparative Example 7 |
|---|---|---|---|---|---|
| Liquid crystal polyester (1) | Parts by weight | 100 | 100 | 100 | 100 |
| Liquid crystal polyester (2) | Parts by weight | — | — | — | — |
| Filling material A | Parts by weight | 67 | 100 | — | — |
| Filling material B | Parts by weight | — | — | — | 43 |
| Filling material C | Parts by weight | — | — | 100 | — |
| Filling material D | Parts by weight | — | — | — | — |
| Mold shrinkage ratio | MD % | 0.35 | 0.38 | 0.33 | 0.29 |
| | TD % | 0.44 | 0.33 | 0.54 | 0.59 |
| Anisotropy ratio | MD/TD — | 0.80 | 1.14 | 0.62 | 0.50 |

Example 6

The liquid crystal polyester resin composition obtained in Example 1 is subjected to drying treatment at 120° C. for 12 hours, followed by molding process with an injection molding machine (model PS40E5ASE, manufactured by Nissei Plastic Industrial Co., Ltd.) under conditions of a cylinder temperature of 350° C. and a mold temperature of 130° C. to produce a connector as shown in FIG. 1. The obtained connector has excellent dimensional stability.

What is claimed is:

1. A liquid crystal polyester resin composition comprising:
   a liquid crystal polyester and greater than 100 to 150 parts by mass, relative to 100 parts by mass of the liquid crystal polyester, of a platy inorganic filler having a primary particle which has a ratio of a primary particle diameter to a primary particle thickness within a range of from 8 to 200, wherein the platy inorganic filler is talc or mica.

2. The liquid crystal polyester resin composition according to claim 1, wherein the platy inorganic filler is mica.

3. The liquid crystal polyester resin composition according to claim 1, wherein the ratio of diameter to thickness is within a range of from 10 to 150.

4. The liquid crystal polyester resin composition according to claim 1, wherein the liquid crystal polyester comprises a repeating unit represented by the following formula (1), a repeating unit represented by the following formula (2), and a repeating unit represented by the following formula (3):

$$-O-Ar^1-CO- \quad (1)$$

$$-CO-Ar^2-CO- \quad (2)$$

$$-X-Ar^3-Y- \quad (3)$$

wherein $Ar^1$ represents a phenylene group, a naphthylene group, or a biphenylylene group; $Ar^2$ and $Ar^3$ each independently represent a phenylene group, a naphthylene group, a biphenylylene group, or a group represented by the following formula (4); X and Y each independently represent an oxygen atom or an imino group (—NH—); and each hydrogen atom constituting the group represented by $Ar^1$, $Ar^2$ or $Ar^3$ is independently optionally substituted with a halogen atom, an alkyl group or an aryl group;

$$-Ar^4-Z-Ar^5- \quad (4)$$

wherein $Ar^4$ and $Ar^5$ each independently represent a phenylene group or a naphthylene group; and Z represents an oxygen atom, a sulfur atom, a carbonyl group, a sulfonyl group or an alkylidene group.

5. A connector molded from the liquid crystal polyester resin composition according to claim 1.

6. A method for producing a liquid crystal polyester resin composition comprising a step of melt-kneading a liquid crystal polyester and greater than 100 to 150 parts by mass, relative to 100 parts by mass of the liquid crystal polyester, of a platy inorganic filler having a primary particle which has a ratio of a primary particle diameter to a primary particle thickness within a range of from 8 to 200.

7. The method according to claim 6, wherein the platy inorganic filler is subjected to the melt-kneading step in form of an aggregate in which the platy inorganic filler is agglomerated.

8. The method according to claim 6, wherein the aggregate is a granular material.

* * * * *